May 11, 1954
A. B. BELGARD
2,677,894
OPHTHALMIC MEASURING DEVICE
Filed Oct. 17, 1951
2 Sheets-Sheet 1
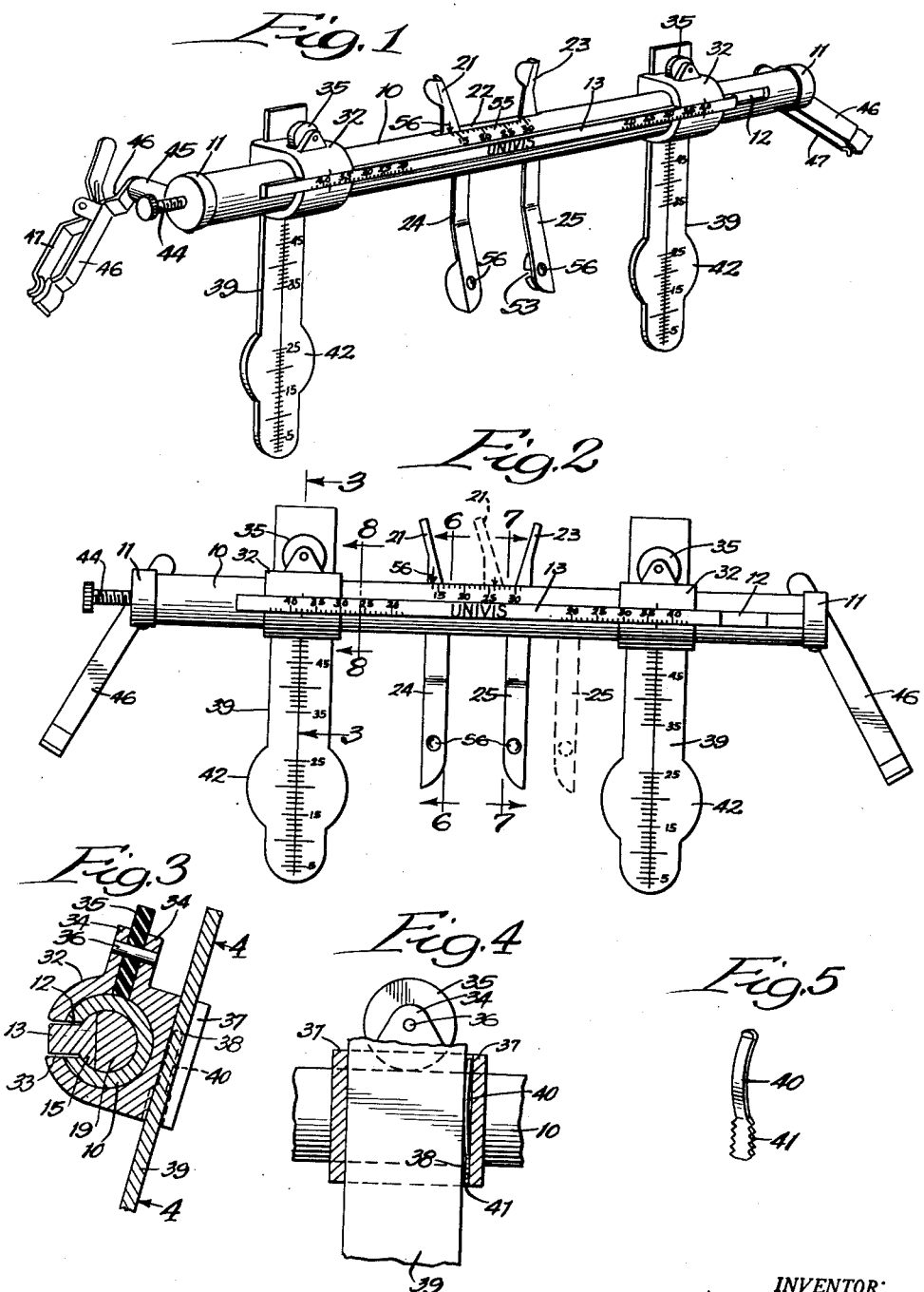
INVENTOR:
Austin B. Belgard,
BY
Dawson & Ooms,
ATTORNEYS.

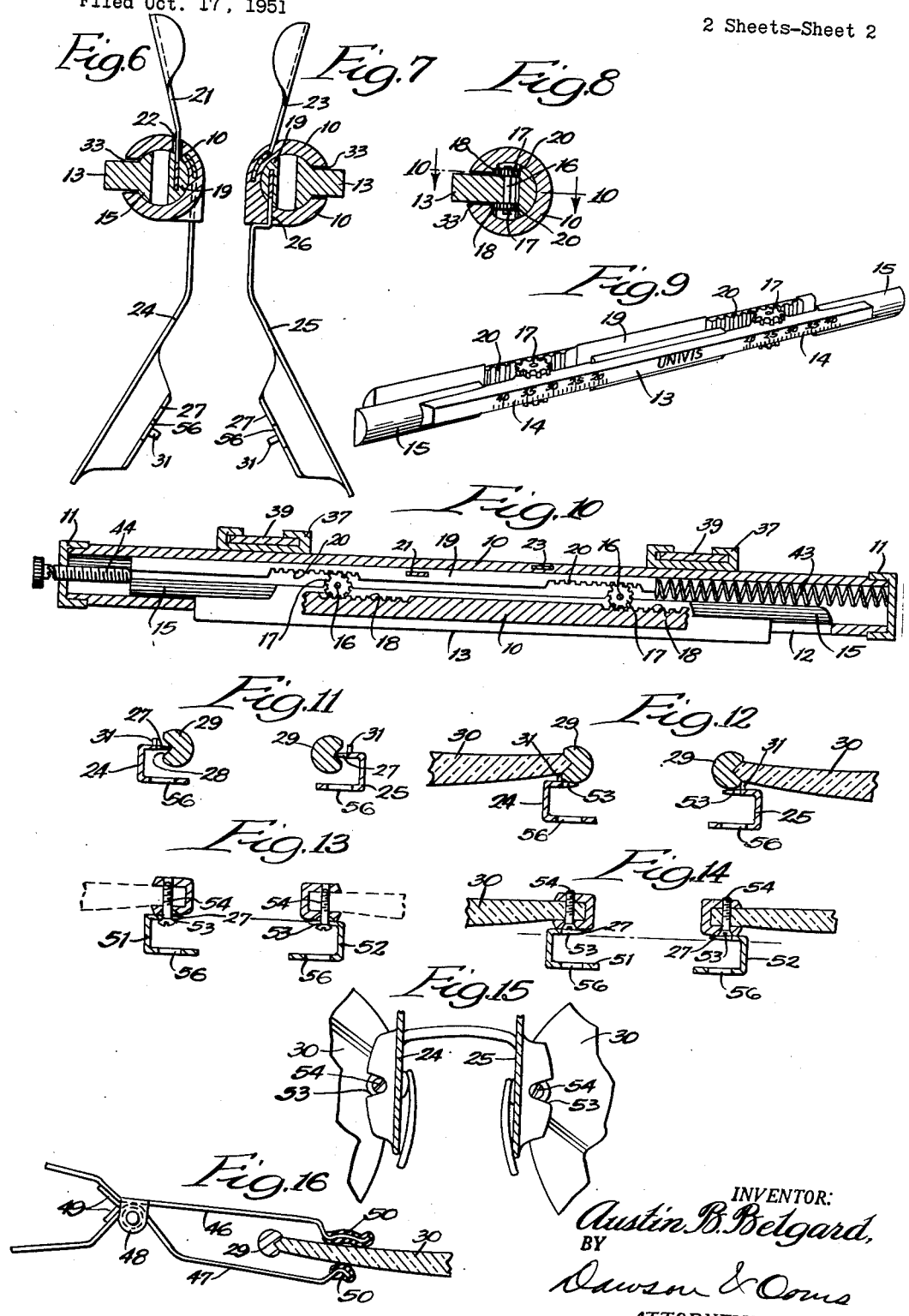

Patented May 11, 1954

2,677,894

UNITED STATES PATENT OFFICE 2,677,894

OPHTHALMIC MEASURING DEVICE

Austin B. Belgard, Evanston, Ill.

Application October 17, 1951, Serial No. 251,667

13 Claims. (Cl. 33—200)

This invention relates to an ophthalmic measuring device. The measuring device is particularly useful for attachment to spectacles or eyeglasses while being upon the wearer and enabling accurate measurements to be taken as to distances between lenses, pupillary distances, vertical differences in the height of eyes, horizontal differences from the center of nasal bulk at the point of pad bearing to either eye, and a number of other measurements, all of the measurements being made by direct determination upon the measuring device.

An object of the present invention is to provide a measuring device which may be attached directly to eyeglasses or eyeglass frames while the same are being worn by wearers and thus permitting direct measurements to be taken with respect to the eyeglasses and the eyes and nose of each wearer, etc. Yet another object is to provide an ophthalmic measuring device for attachment to eyeglasses or eyeglass frames permitting direct measurement of direct or combined pupillary distance, direct measurement of distance between lenses, direct determination of vertical differences in the height of eyes, and direct determination of horizontal differences in distance from the center of the nasal bulk at the point of pad bearing to either eye, etc. Yet another object is to provide a measuring instrument of unitary structure permitting optional attachment thereto to spectacle frames or to lens-equipped frames in a minimum of time while permitting quick adjustment of measuring devices with respect to the inner portions of the eyeglass frames and other parts to be measured. Other specific objects and advantages will appear as the specification proceeds.

The invention is illustrated in a preferred embodiment by the accompanying drawings, in which—

Figure 1 is a perspective view of a measuring device embodying my invention; Fig. 2, a front view in elevation; Fig. 3, an enlarged detail sectional view, the section being taken as indicated at line 3—3 of Fig. 2; Fig. 4, a detail sectional view, the section being taken as indicated at line 4—4 of Fig. 3; Fig. 5, a perspective view of a spring which may be employed; Fig. 6, a detail sectional view, the section being taken as indicated at line 6—6 of Fig. 2; Fig. 7, a detail sectional view, the section being taken as indicated at line 7—7 of Fig. 2; Fig. 8, a transverse sectional view, the section being taken as indicated at line 8—8 of Fig. 2; Fig. 9, a perspective view of the scale panel and slide bar for operating the same; Fig. 10, a broken longitudinal sectional view, the section being taken as indicated at line 10—10 of Fig. 8; Fig 11, a broken sectional view showing the engagement of the clamp members with the inner groove of the lens rim or frame; Fig. 12, a view similar to Fig. 11 but showing the engagement of the clamping members with the lens rims; Fig. 13, a view similar to Fig. 11 but showing a modified form of clamping members engaging the screws of the lens rims; Fig. 14, a view similar to Fig. 13, but showing the clamping members aligned with the screws of the rims; Fig. 15, a broken sectional view showing the alignment of the clamping members with the screws of the rims; and Fig. 16, a sectional view showing a lens grasped by a clamp support of the measuring device.

In the illustration given, 10 designates a housing, which may be of any particular shape or cross-section. In the illustration given, the housing is circular and is provided at its ends with endpieces or caps 11. The housing is provided along its front side with a longitudinally-extending slot 12.

Slidably mounted within the slot 12 is a panel member 13 having a protruding surface provided at either end with a scale 14. At each end, the panel 13 is provided with semi-circular guide members 15 which extend within the housing 10 and engage the inner surface thereof. As shown more clearly in Fig. 8, the panel 13 is provided with a rearwardly-extending portion rotatably supporting a pair of spaced gear shafts 16, and upon each end of each shaft is mounted a planetary gear 17. The gears 17 mesh with a row of teeth 18 on the interior of the housing 10 and on each side of the panel member 13.

For actuating the gears 17 and thus advancing the panel member 13 along the tracks provided by teeth 18, I provide a slide bar 19 having spaced rows of teeth 20 meshing with the gears 17. For moving the shaft 19, I provide a finger grip or lever 21 which extends through a longitudinal slot 22 in the housing 10 and is embedded within the slide bar 19, as shown more clearly in Fig. 6. Thus, when the lever or finger grip 21 is moved longitudinally of the housing 10, it causes a corresponding movement of the bar 19 and through the action of the planetary gears 17, the panel 13 is advanced in the same longitudinal direction. I prefer to equip the housing 10 with a fixed or stationary finger grip or lever 23, which may be embedded within the plastic housing 10, as shown in Fig. 7.

Depending from the housing 10 and fixed thereto is a stationary post member 24. The member 24, as shown in Fig. 6, is secured to the housing 10 so as to remain permanently in the fixed position shown. A similar post member 25 extends freely through a slot 26 in the housing 10 and is embedded within the actuating bar 19. With this structure, when the lever or finger grip 21 is advanced toward the stationary grip 23, the bar 19 is advanced simultaneously and carries the post 25 longitudinally of the housing 10, the scale member 13 being simultaneously advanced in the same direction.

The posts 24 and 25 are preferably of the shape illustrated in Fig. 6, and are each provided on their rear sides with U-shaped flanges terminating in points 27. The points 27, as illustrated more clearly in Fig. 11, are adapted to engage within the groove 28 of the lens rim or frame 29. When the rim 29 has its groove already filled with a lens 30, the member 27 is still able to engage the rim 29 by reason of an inwardly-extending projection 31, as shown more clearly in Fig. 12.

In order to measure pupillary distances, the vertical distances in the height of the eyes, and also horizontal differences in distance from the center of the nose to either eye, I provide a carrier 32 on each end portion of the housing 10. The carrier 32 is provided with a cylindrical bore receiving the housing 10, and is provided with a longitudinal slot 33 aligned with the slot 12 in the housing 10. The slot 33 of the carrier 32 receives the forward-extending scale portion of the panel member 13, as illustrated best in Fig. 3. The carrier member 32 is provided with spaced upwardly-extending bosses 34, receiving between them a roller 35 mounted upon shaft 36. Thus the roller 35 facilitates longitudinal movement of the carrier 32 upon the housing 10. The carrier is provided with a rearwardly-extending portion 37 having a slot 38 therein receiving the segment measure slide 39. To maintain the slide member 39 tightly within the slot 38, I prefer to employ a spring member 40, as shown more clearly in Figs. 3, 4 and 5. The lower end of the spring member 40 is preferably enlarged and provided with serrations or teeth 41 which grip the side walls about the slot 38 and thus anchor the spring 40 firmly in position along one side of the slot 38.

The segment measure slide 39 is preferably formed of transparent material such as Lucite or other plastic, and carries scale indicia thereon. I prefer to form the slides with an enlarged portion 42 which enables the technician to indicate width of vision, etc. by ink marks thereon in making the examination.

Within the housing 10 is a compression spring 43 which urges the slide bar 19 toward the opposite end of the housing. At the opposite end of the housing, the cap 11 is tapped to receive an adjustment screw 44, as shown more clearly in Fig. 10. The adjustment screw 44, by its engagement with the bar 19 and end portions 15 of the panel member 13, permits the stopping of these members at any selected position.

In order to take care of lens-equipped glasses or glasses of unusual shape, I provide special clamping means which will now be described. The housing 10 is provided at each end with a rearwardly-extending post 45, on which is pivotally mounted a grip member 46. A clamping body 47 is pivotally mounted upon the gears 48 with which the member 46 is provided, and a spring 49 normally urges the jaw toward closed position. The ends of members 46 and 47 are preferably provided with a rubber surfacing 50, as indicated more clearly in Fig. 16, so that the lens 30 will not be injured by contact therewith.

In the modification illustrated in Figs. 13, 14, and 15, the post members 51 and 52 are provided with central recesses 53 so that when the screws 54 are slightly unscrewed, these recesses may be brought into engagement with the screws. Alternatively, the screws 54 may be left in tightened position and the members 51 and 52 may be simply brought into alignment therewith, as illustrated in Fig. 14, and the clamping members 46 and 47 may be used for holding the glass frame in a fixed position until the members 51 and 52 are brought into the desired alignment shown in Fig. 14, and then the screw 44 may be moved inwardly to engage the members 13 and 19, thus confining the members 51 and 52 in the aligned positions shown in Fig. 14.

The housing 10 is provided with a scale 55, and if desired, the lever 21 may be provided with an arrow 56 adapted to be aligned with marks on the scale 55 to determine the distance between lenses.

Operation

In the operation of the structure shown in Figs. 1 to 12, inclusive, and after a pair of glasses without lenses have been fitted upon the patient, the measuring device shown is placed in front of the glasses frame and set in position thereon by moving the lever 21 inwardly, as indicated in dotted lines on Fig. 2, so that the points 27 of the members 24 and 25 may engage the groove on the inside of the lens rims 29, as shown more clearly in Fig. 11. When the lever 21 is released, the spring 43 urges the member 25 into engagement with the rim 29 and the two lens rims are thus gripped between the points 27 of members 24 and 25. The arrow 56 on lever 21 will now indicate the distance between lenses. Simultaneously with this operation, the scale panel 13 is moved laterally, carrying with it the scales 14. When the depending segment measuring slides 39 are moved into alignment with the eyes and pupillary distances thereon determined, the scales 14 thereabove will also indicate the distance of the eye from the center of the nose. Thus, in a minimum of time, all of the required measurements for the frames and eyes can be made.

Even when the spectacle frame is equipped with lenses, as illustrated in Fig. 12, the members 24 and 25 may be readily secured thereto by bringing the projected pins 31 into engagement with the rims 29.

When the posts 51 and 52 are employed, the groove 53 therein may be brought into engagement with the screws 54 when they are slightly unscrewed, as illustrated in Fig. 13, or, if the lens frames are held by the clamps 46 and 47 at each end, the member 52 may be adjusted with the frame to bring the apertures 53 into alignment with the screws 54 of the lens rims and the parts may be held in this position by movement of the adjustment screw 44 inwardly into contact with the slide bar 19. The members 24 and 25 are provided along their front side with apertures 56 to enable the accurate positioning of the cut-away portions 53 with the screws 54.

In the use of the attachment clamps or posts 24 and 25, the lever 21 enables the slide bar 19 to be moved smoothly against the force of spring 43 and the teeth 20 thereon rotate the planetary gears 17 to cause them to move along the track 18 of the housing 10. As the gears move longitudinally of the housing, they carry the panel member 13 with them and thereby shift the scales 14 laterally of the housing.

The foregoing operation enables the device to be used upon glasses with lenses or without lenses, to effect direct measurement of a combined pupillary measurement, a direct determination of the distance between lenses, a direct determination of the vertical differences in the height of eyes, a direct determination of the horizontal distances from the center of the nose to either eye, measurements of the width of vision, and a variety of other measurements which will be obvious from the structure shown.

While in the foregoing specification, I have set forth a specific structure in considerable detail for the purpose of illustrating an embodiment of the invention, it will be understood that such details of structure may be varied widely by those skilled in the art without departing from the spirit of my invention.

I claim:

1. In a measuring device of the character set forth, a hollow housing having a longitudinal slot in the front portion thereof, a panel member movable in said slot and equipped with scales at each end, a fixed post member depending from said housing, a movable post in spaced relation from said first-mentioned post, means for moving said panel member and said second-mentioned post longitudinally of said housing, carrier members slidably mounted on said housing and equipped with slots aligned with the slot of said housing and receiving said panel member, and scale-equipped transparent slides slidably carried by each of said carriers.

2. The structure of claim 1, in which each of the slides is provided with a circular lower portion having scale marks thereon.

3. The structure of claim 1, in which the carriers are equipped with rollers engaging said housing.

4. The structure of claim 1, in which the carriers are equipped with slots receiving said slides and in which a spring finger is mounted for engagement with the edge of each slide.

5. In a measuring device of the character set forth, a housing having a slot in the forward end thereof, a panel member slidably mounted in said slot, planetary gears mounted upon said panel member, said housing providing teeth tracks on its inner surface for engagement with said gears, a slide bar in said housing having teeth engageable with said gears whereby upon longitudinal movement of said slide bar, said panel member is moved in the same direction, a spring in said housing urging said slide bar in one direction, a stop screw threadably mounted in the end of the housing opposite said spring, a post fixed to said housing and depending therefrom, a second post secured to said slide bar and depending therefrom, and lever means for moving said slide bar.

6. The structure of claim 5, in which said lever is in the form of a finger grip extending upwardly from said housing and in which a fixed finger grip is secured to said housing at a spaced distance therefrom.

7. The structure of claim 5, in which said panel carries a pair of spaced shafts with gears on each end thereof and which engage corresponding teeth on the housing and on said slide bar.

8. In a measuring device of the character set forth, for measuring eyeglasses having screws at their inner rim portions, a housing member, a fixed post depending therefrom, a slidable member slidably mounted on said housing, a post member depending from said slidable member and movable toward said first-mentioned post, a compression spring within said housing normally urging said slidable member and the post carried thereby toward said first-mentioned post, each of said posts having rearwardly and inwardly turned flange portions apertured for alignment with the screws of said rims, and a screw member threadably engaging one end of said housing to stop said slidable member when said apertured flange portions are aligned with said screws.

9. The structure of claim 8, in which the housing is equipped with clamping means for engaging the lenses of eyeglasses to support the same when the apertures of said post flanges are aligned to support the same while the apertures of said post flanges are being aligned with said screws.

10. In a measuring device of the character set forth, a housing, a pair of slides depending from said housing, means for slidably securing said slides upon said housing, said slides being provided with scales for alignment with the pupils of the eye, and a pair of posts depending from said housing between said slides, at least one of said posts being movable away from said other post for determining the space between lenses, said slidable post being movable independently of said slides.

11. The structure of claim 10, in which one of said posts is movable and the other of said posts is fixed upon said housing.

12. The structure of claim 10, in which said posts are equipped with means for engaging the rims of glasses.

13. In a measuring device of the character set forth, a housing, a pair of slidable members mounted upon said housing, a pair of slides carried by said members and depending therefrom, said slides having transparent portions equipped with scales adapted to be aligned with the pupils of the eyes, a fixed post carried by said housing, and a movable post mounted upon said housing between said slides, said housing having scale marks thereon between said posts and adjacent said slidable members.

References Cited in the file of this patent

UNITED STATES PATENTS

| Number | Name | Date |
|---|---|---|
| 993,252 | Jaffe | May 23, 1911 |
| 2,491,312 | Henry et al. | Dec. 13, 1949 |